(No Model.)
M. L. BOSWORTH.
CHEMICAL FIRE EXTINGUISHER.
No. 527,036. Patented Oct. 2, 1894.
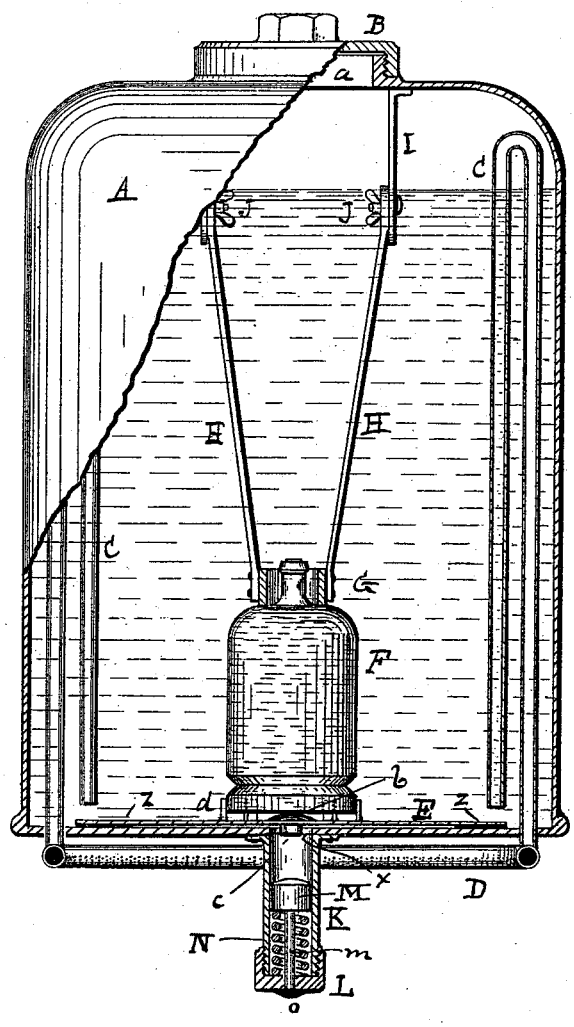
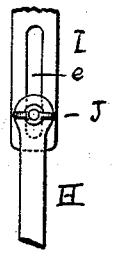
Witnesses.
Janet W. Fink
Warren R Pine
Inventor.
Martin L. Bosworth

UNITED STATES PATENT OFFICE.

MARTIN L. BOSWORTH, OF WARREN, RHODE ISLAND.

CHEMICAL FIRE-EXTINGUISHER.

SPECIFICATION forming part of Letters Patent No. 527,036, dated October 2, 1894.

Application filed September 30, 1893. Serial No. 486,842. (No model.)

*To all whom it may concern:*

Be it known that I, MARTIN L. BOSWORTH, of the town of Warren, in the county of Bristol, in the State of Rhode Island, have invented a new and useful Improvement in Chemical Fire-Extinguishers; and I declare the following to be a specification thereof, reference being had to the accompanying drawings.

Like letters indicate like parts.

Figure 1 is a view of my invention as seen partly in side elevation and partly in vertical, diametrical section. Fig. 2 shows in elevation the means of adjustably connecting the brace and rod, by which the vessel for chemicals is held from vertical displacement.

My invention relates to that class of chemical fire-extinguishers, which consist of a tank containing water, and provided with a discharge pipe, in combination with a fragile vessel, within said tank, to contain a chemical substance, suitable to form carbonic-acid gas, when precipitated into the water, and means for breaking said vessel to effect such union of the chemical substance with the water.

My invention is an improvement upon the device shown and claimed in my Letters Patent No. 515,460, of February 27, 1894, (Serial No. 444,340,) and consists of certain novel details of construction, which are hereinafter particularly described and specifically set forth in the claims.

In the drawings A is a tank, preferably metallic, and of a cylindrical or other suitable shape. It has at the top a neck or opening $a$, which is covered by a cap B, screw-threaded, or otherwise adapted to fit over the neck or opening $a$. The bottom of the tank has a central opening, as seen at $x$. Bent tubes C have their shorter arms extending down within the tank nearly to the bottom thereof, and their longer arms extending through the bottom. Said tubes open into and support a discharge or sprinkling tube D, outside the tank and beneath the bottom of the same. The tube D has a number of small openings, as shown in the drawings, which are adapted to discharge the water in small jets.

Upon the bottom of the tank is a disk or plate E of flexible sheet-metal, and it is soldered along its edge to the tank-bottom, as seen in solid black lines at $z$. The plate E has a central knob or boss $b$, preferably solid, extending upward, and a central projection $c$, extending downward. The boss $b$ is of a diameter greater than that of the aperture $x$ in the tank-bottom.

A fragile vessel or receptacle F, of glass, or other suitable material, rests upon the boss $b$ of the plate E, and is held from lateral displacement by the uprights $d$. The vessel F is secured against vertical displacement by the collar G, upon the top thereof, and surrounding the neck of the vessel, and by rods H, fastened to said collar and extending upward to braces I, which braces are fastened to the top of the tank, as shown. The braces I are longitudinally slotted, as seen at $e$ in Fig. 2. Each rod H is adjustably fastened to its brace I by a thumb-screw J, which passes through the rod at its upper end, (which is enlarged,) and through the slot $e$ of the brace, and when the rods are in such position as to press the collar G firmly down upon the receptacle F, they are clamped to the braces by tightening the screws J.

From the center of the tank-bottom and extending downward, is a tube K, fastened to the tank. It has a screw-threaded cap L, which is centrally perforated. A piston-shaped hammer M, having a rod $m$, extending downward therefrom, is movable within the tube K, by means of a spiral spring N, when the latter is free to act. The hammer M is, however, prevented from such movement by the soldering of the hammer-rod $m$ to the screw-cap L, through the central aperture thereof, by the mass $o$ of solder, which is fusible at a comparatively low temperature.

A bail or handle may be provided by which to suspend the apparatus within an apartment wherever desired.

Having thus described the several parts of my device, I will now explain the operation of the same.

The receptacle F is filled with any chemical substance, which, when wet with water, will generate carbonic acid gas and is secured in position, as shown in Fig. 1. The tank is filled nearly full of water. In case of a fire in the apartment where this tank is placed, the increasing temperature will soon reach the degree, at which the solder $o$ will melt, whereupon the hammer M, being no longer held by its rod m to the cap L, yields to the force of the spring N, which is now free to act, and is driven powerfully up against the projection c of the plate E. The plate E, being very thin and flexible, yields to the blow and its boss b is driven against the bottom of the fragile receptacle F and breaks said vessel. The contents of the vessel, now mingling with the water in the tank, generates a large volume of carbonic-acid gas and the water is forced with great pressure, out of the tank, through the tubes C, into and out of the sprinkler D, and quickly extinguishes the fire. The flexible plate or disk E, by means of its soldered rim, shown at z, effectually closes the central aperture x in the tank-bottom, thus preventing any escape of water or gas from the tank at that place, and yet is so thin and pliant as to yield to the blow of the hammer and to communicate the full force of said blow to the fragile receptacle F to break the same. As the diameter of the boss b, which is fastened upon the disk E is greater than that of the aperture x in the tank-bottom, the force or pressure of the gas in the tank is prevented from bending the disk E outwardly into the tube K. The adjustability of the rods H upon the braces I allows the use of receptacle F of any desired size and causes such receptacle to be securely held in position.

On account of the soldered connection of the hammer-rod m with the screw-cap L, it can be readily withdrawn from the tube K or inserted therein, and so the tension of the spring N may be easily regulated, either by a screw-threaded connection of the hammer M with its rod m, or by removing the solder o, changing longitudinally the position of the rod in the central perforation of the cap L, and resoldering the rod to the cap.

I claim as a novel and useful invention and desire to secure by Letters Patent—

1. In combination with a chemical fire-extinguisher, having a tank and cover and a fragile vessel secured in said tank to contain the chemical substance, the tubes C and sprinkler D, the flexible metallic disk E, fastened to the tank-bottom and in contact with the bottom of said vessel, a spring-actuated hammer, adapted, when released to strike a blow upon said disk and thereby to break said vessel, but held from such movement by a mass of solder, fusible at a comparatively low temperature and fastening said hammer to a fixed support, substantially as shown.

2. The combination of the tank A, having a central aperture x in its bottom, the cover B, the tubes C, the sprinkler D, the flexible, metallic disk E, soldered at z to the tank-bottom and covering said aperture x, the central boss b upon the disk E, of a diameter greater than that of the aperture x, the central projection c extending beneath said disk E, the fragile vessel F for chemicals, resting upon the boss b of the disk E and secured in position within the tank, and a spring-actuated hammer, adapted, when released, to deliver a blow upon said projection c of the disk E, but held from such movement by a mass of solder o, fusible at a comparatively low temperature and fastening said hammer to a fixed support, substantially as shown.

MARTIN L. BOSWORTH.

Witnesses:
DANIEL W. FINK,
WARREN R. PERCE.